[United States Patent Office — 3,636,188 — Patented Jan. 18, 1972]

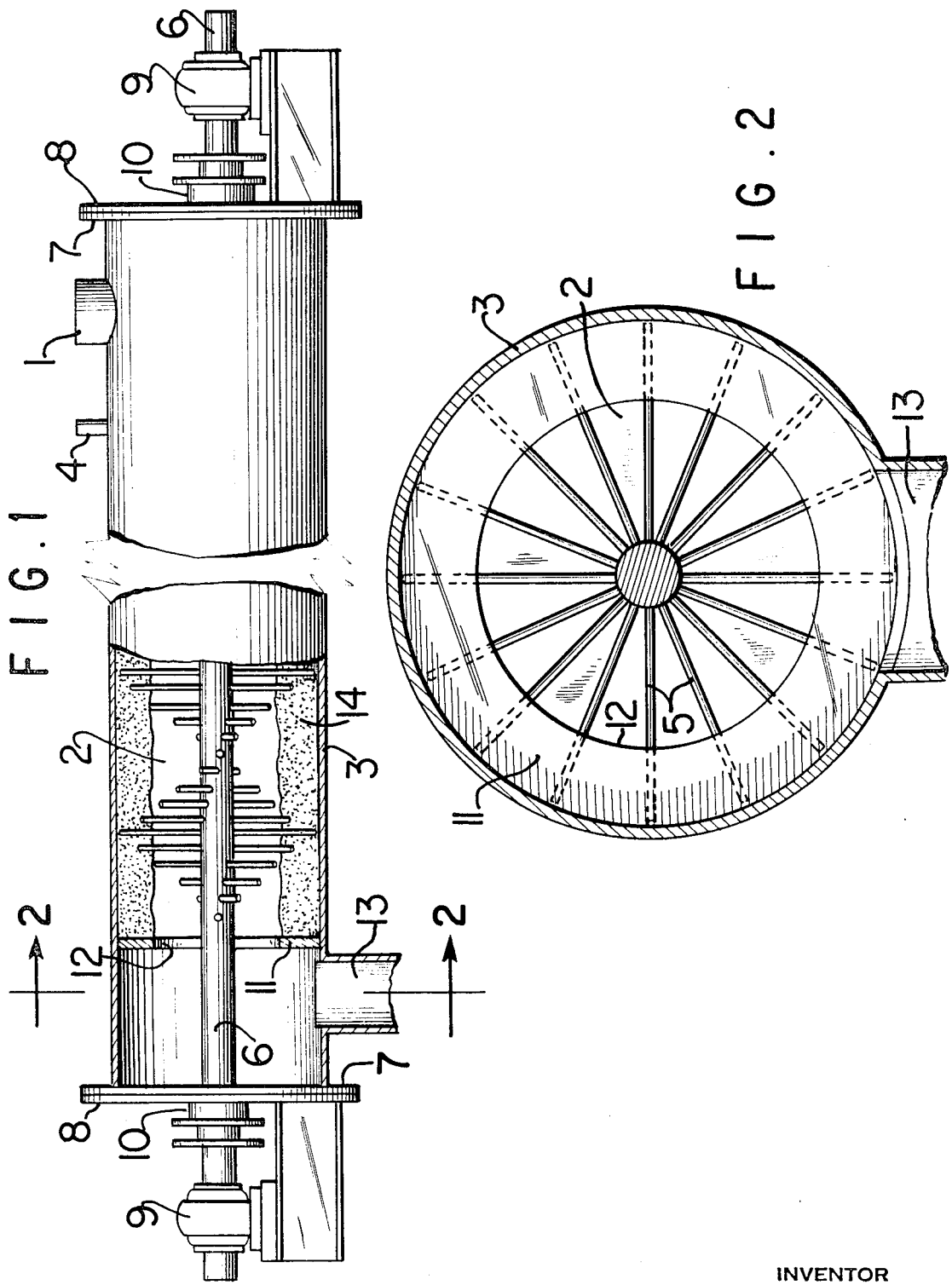

3,636,188
PROCESS FOR WET PELLETIZING
CARBON BLACK
Richard E. Driscoll, Monroe, La., assignor to
Cities Service Company
Filed Nov. 26, 1969, Ser. No. 880,017
Int. Cl. B01j 2/12
U.S. Cl. 264—117                                       5 Claims

ABSTRACT OF THE DISCLOSURE

Wetted particles of carbon black are agitated in an elongated cylindrical conduit to form wet pellets of the particles. Agitation is accomplished by means of revolving agitation members which also move the particles toward a discharge outlet through which wet pellets are removed from the zone of agitation. The amount of work expended in agitating and axially advancing the particles within the conduit is increased by (1) revolving the agitating members fast enough to sling the particles out toward the conduit wall and thus shape the particles into an annular bed by centrifugal force, and (2) compressing the axially advancing bed, by revolution of the members, against a dam which extends around the periphery of the pelletizing zone and projects inwardly toward the center of the zone.

BACKGROUND OF THE INVENTION

This invention relates to improvement in the process for forming wet pellets of carbon black by agitating wetted particles of the black in a pelletizing zone bounded by an elongated cylindrical conduit, the agitation being accomplished by means of agitating members which are affixed to a rotatable shaft that extends through the conduit in coaxial relationship therewith. The agitating members extend outwardly from the shaft toward the inner wall of the conduit and are thus revolved by rotation of the shaft. The agitating members can be rods which are staggered longitudinally along the shaft and arranged in a spiral pattern. An axial component of motion—respective to the cylindrical pelletizing zone—is imparted to the wetted particles so that they are moved from an inlet at one end of the zone to a pellet discharge outlet located at the other end of the zone.

The use of a cylindrical pelletizing zone is now generally preferred over the use of older processes wherein pelletizing was accomplished in a trough having a U-shaped cross-section. The use of a cylindrical zone not only permits formation of rounder and more uniformly-sized pellets with less dust, but also reduces damaging vibration of the pelletizer which results from intermittent break-off of cake which forms at the corners of a trough. Nonetheless, wet pelletization of carbon black in a cylindrical pelletizing zone has been subject to limitations with respect to the amount of work expended in formation of the pellets, and it is well known that this factor has considerable influence on the physical properties of the resulting pelletized product.

Heretofore, wet carbon black pellets have been formed in an unobstructed cylindrical pelletizing zone wherein agitation and axial movement of the wetted bed of particles is resisted primarily by the inertia of the mass and friction between the mass and the cylindrical wall of the zone. It will be appreciated that once the agitating members have reached operating speed, the inertia of the bed has been substantially overcome and the amount of work which is expended in forming the pellets can only be significantly changed by readjusting the speed of the agitating members to alter the friction between the wetted-particle bed and the wall of the pelletizer. Where a substantial increase in the work input is desired, the required speed of agitation may well exceed the practical operating limits of the pelletizing apparatus. As a consequence, work input cannot be increased to the level required to effect a desirable alteration in the physical properties of the pellets.

SUMMARY OF THE INVENTION

It is therefore an object of the present invention to overcome the limitations of work input which were inherent in carbon black pelletizing processes having a cylindrical pelletizing zone. This, and other objects and advantages of the present invention, will become apparent from the following description and the appended claims.

In accordance with the present invention, powdered carbon black is wetted with a liquid pelletizing medium such as water, an aqueous solution of a binder, an oil, or an emulsion of oil with water. To accomplish pelletization, the wetted carbon black particles are agitated while being adavanced axially through an elongated cylindrical pelletizing zone wherein both the agitation and the advancement of the particles are effected with a series of transversally extending agitating members which are revolved around the longitudinal axis of the zone. For increasing the amount of work expended in forming the pellets, two conditions are established:

(1) The agitation members are revolved at a speed which slings the wetted particles of carbon black out against the cylindrical wall which bounds the pelletizing zone, thus shaping the wetted particles into an annular bed. Accordingly, this annular bed conforms to the conduit wall by centrifugal force and thus leaves a space, which is substantially void of particles, along the center line of the pelletizing zone.

(2) Axial movement of the annular bed through the pelletizing zone is impeded by means of a dam which extends around the circumferential periphery of the zone and projects inwardly toward the center line thereof. The inner limit of the dam bounds a passage through which the annular bed discharges from the pelletizing zone, and it will be appreciated that this passage should have a cross-sectional area that is significantly smaller than that of the pelletizing zone. By such arrangements, the annular bed can be forcefully compressed against the dam by rapid revolution of the agitating members, so that at any given speed, the amount of work employed for agitating and advancing the bed within the pelletizing zone can be greatly increased. Of necessity, the dam is located toward the downstream end of the pelletizing zone in order to establish an annular bed of suitable length.

The effect of each of the above-described conditions is increased friction, or drag, between the moving particles and stationary surfaces whereby a greater amount of work is employed in overcoming the drag. In the final analysis, this means that the wetted particles can be more forcefully driven together for the formation of pellets. By revolving the agitating members at speeds which sling the particles out toward the wall of the pelletizing zone, the particles are maintained in the vicinity thereof by centrifugal force and are thus proximated for contact with the full circumference of the wall over the entire length of the zone. Furthermore, by concentrating the particles near the circumferential periphery of the zone, they are placed in a region whereby contact between the particles and the agitating members has the benefit of maximum velocity, i.e. near the outer ends of the agitating members.

Use of the dam further increases the drag coefficient between the particles in the annular bed and the agitating members by virtue of the fact that the particles are squeezed together so that greater work is required to move the agitating members through the bed.

Since a swirling motion is imparted to the bed by revolution of agitating members, considerable drag therefore occurs between the particles and the wall of the pelletizing zone. Because of this wall friction, however, the bed swirls at a somewhat slower speed than the agitating members, so that the members still move through the bed, but at a relatively low velocity. It will therefore be appreciated that drag between the agitating members and the particles in the bed can be considerably increased by the forceful compression of the bed against the dam. In practice, therefore, the dam should bound a constricted pellet-discharge passage having a cross-sectional area which is at least about 20% less than that of the pelletizing zone. To particular advantage the pellet discharge passage bounded by the dam can have a cross-sectional area of about 20% to about 60% less than that of the pelletizing zone.

The velocity at which the agitating members must be revolved in order to maintain the wetted particles as an annular bed against the wall of the pelletizing zone is dependent, of course, upon the particular pelletizer employed and the density of the material in the bed; but as a general rule, the velocity of the outer ends (tip velocity) of the agitating members should be at least about 1500 feet per minute, and velocities within the range of 1500–3000 feet per minute can be employed to advantage.

Once wet pellets have been formed in accordance with the present invention, they can then be polished and dried in accordance with conventional methods.

BRIEF DESCRIPTION OF THE DRAWINGS

FIG. 1 is a side view, partly in section, of a pelletizer apparatus which can be employed in carrying out the present invention.

FIG. 2 is a sectional view, somewhat enlarged, of the pelletizer of FIG. 1 along the line 2—2.

DESCRIPTION OF THE PREFERRED EMBODIMENTS

With reference to FIGS. 1 and 2, carbon black powder is introduced through an inlet 1 into a pelletizing zone, generally depicted at 2, bounded by an elongated cylindrical conduit 3. A liquid pelletizing medium is introduced into the pelletizing zone through an inlet line 4. Agitation for pelletizing the wetted carbon black particles is accomplished by means of agitating members 5 affixed at their inner ends to a rotatable shaft 6 which extends through conduit 3 in coaxial relationship therewith. The agitating members extend transversally within the pelletizing zone and terminate near the circumferential wall of the conduit 3. The agitating members 5 are staggered longitudinally and are arranged in a spiraling pattern around the shaft, the pitch angle being 22½° in the illustrated case. With respect to the pelletizing zone, the agitating members are thus arranged to impart both a rotary and an axial component of motion to the wetted carbon black particles upon rotation of shaft 6. The conduit 3 is provided with end flanges 7 and closure plates 8. The rotatable shaft is supported at either end by antifriction bearings 9. Stuffing boxes seal the interior of the conduit from the atmosphere.

An annular plate, or dam 11, is arranged transversally of the pelletizing zone at the downstream end thereof. The dam is affixed to the wall of conduit 3 and has a central opening through which wet pellets discharge from the pelletizing zone. The pellets are removed from conduit 3 through chute 13.

In operation, the carbon black powder and the liquid pelletizing medium are fed to the pelletizing zone at preestablished mass-flow rates for the formation of pellets. Using water or an aqueous solution of a binder, the ratio of water-to-black will usually be within the range of about 60/40 to about 40/60, and generally about 50/50. In the pelletizing zone the wetted carbon black particles are then subjected to the action of the agitating members 5 by rotation of shaft 6. As previously indicated, the shaft is rotated at sufficient speed to sling the wetted particles out against the circumferential wall of the conduit 3, and to maintain the particles there by centrifugal force, so that they are shaped into an annular, swirling bed during transit through the pelletizing zone. Such an annular bed is depicted at 14 in the drawings.

Using the pelletizer shown in the drawings, clockwise rotation of shaft 6 at sufficient speed e.g. sufficient to provide a tip velocity of 1500–3000 f.p.m. to the agitating members-forms and maintains the annular bed 14 by centrifugal force and also forcefully propels the bed to the left and compresses it against the dam 11. The particles in the bed are thus exposed to maximum rotational velocity imparted by the member 5, i.e. at their outward ends, while resistance to passage of the members through the bed is increased by the compression against the dam. It will be appreciated that forming the annular bed and compressing the same by means of the dam has the compounded effect of increasing the work which is expended into the bed, at any given shaft speed, for formation of wet pellets.

Example

An HAF grade of carbon black was wet pelletized in an apparatus substantially as depicted in FIGS. 1 and 2. Afterwards, the pellets were polished and then were dried in a conventional manner to achieve a moisture content of about 0.10%–0.30% by weight.

The pelletizer conduit had an inside diameter of 20 inches and a length of about 10 feet. The agitating members were ⅝ inch rods having a length of 19 inches and spaced ⅝ inch apart at a 22½° pitch angle.

In the first experiment, the carbon black was pelletized without the use of a dam. In the second experiment, the pelletizer was equipped with a dam having an outside diameter of 20 inches and an inside diameter of 14 inches. In the third experiment, a 20 inch O.D. x 12 inch I.D. dam was employed.

Operating conditions were as follows:

|  | Carbon black feed rate, lbs./hr. | Water [1] feed rate, lbs./hr. | Pelletizer r.p.m. | Power consumption of pelletizer, watts per pound of carbon black |
|---|---|---|---|---|
| Experiment I (no dam) | 1,170 | 1,170 | 500 | 9.108 |
| Experiment II (3″ dam) | 1,100 | 1,170 | 480 | 12.456 |
| Experiment III (4″ dam) | 1,170 | 1,170 | 420 | 14.313 |

[1] Contained about 0.0006 lb. of molasses per lb. of water.

The amount of work expended in wet pelletizing the carbon black is indicated by power consumption of the pelletizer. Striking increases in work of 137% and 157% were obtained by means of a 3″ and a 4″ dam, respectively. The most important effect provided by these increased work inputs was an increase in pellet density without extreme reduction of carbon black structure, the latter being determined by dibutylphthalate absorption:

|  | Bulk density, lb./ft.[3] | Bulk density, percent of Exp. I | DBP | DBP, percent of Exp. I |
|---|---|---|---|---|
| Unpelletized black | ca. 2 | ca. 950 | 141 | 101.4 |
| Pellets of— |  |  |  |  |
| Experiment I | 19.1 | 100 | 139 | 100 |
| Experiment II | 20.5 | 107 | 133 | 95.7 |
| Experiment III | 21.0 | 110 | 130 | 93.5 |

It will be appreciated by those skilled in the art that one main purpose of pelletizing carbon black is to effect an increase in bulk density so that shipping cost of the product can be minimized. Even though a change in the bulk density of the pellets may appear to be minor, it can nonetheless have a decided effect on the shipping cost of large orders, e.g. shipments of several hundred thousand pounds.

As previously indicated, density of the pallets was increased in Experiments II and III without excessive breakdown of the carbon black structure. This is a significant result since it is desirable to preserve structure, and excessive break-down thereof during pelletizing is usually attributed to over-working of the black. In these cases, however, it will be noted that although increased work provided denser pellets, the structure break-down was not excessive.

While the invention has been described with reference to particular materials, conditions, apparatus and arrangements thereof, it will be understood that other embodiments will become apparent which are within the scope of the invention as defined by the appended claims.

Therefore what is claimed is:

1. In a process for wet pelletizing carbon black wherein powdered carbon black particles are wetted with a liquid pelletizing medium and the resulting wetted particles are agitated to form wet pellets while advancing axially through an elongated cylindrical pelletizing zone, agitation and advancement of said particles being effected with a series of agitating members which extend transversally within said zone and revolve around the longitudinal axis of the zone, the method of increasing the amount of work expended in forming the pellets, said method comprising:

(a) shaping the wetted powder particles into an annular bed which conforms to the circumferential periphery of the cylindrical pelletizing zone by rapid revolution of said agitating members, (b) impeding the axial movement of said annular bed through said pelletizing zone with a dam which extends around the circumferential periphery of said zone and which projects inwardly toward the center line thereof and bounds a discharge passage for said annular bed, said passage having a cross-sectional area which is at least about 20% less than that of the pelletizing zone, thus forcing said annular bed against said dam by rapid revolution of the agitating members and increasing the amount of work employed for agitating and advancing said particles within the pelletizing zone.

2. The process of claim 1 wherein the liquid pelletizing medium is an aqueous medium.

3. The process of claim 1 wherein the tip velocity of the revolving agitating members is at least about 1500 feet per minute.

4. The process of claim 3 wherein the tip velocity of the revolving agitating members is within the range of about 1500 to about 3000 feet per minute.

5. The process of claim 1 wherein the discharge passage bounded by said dam has a cross-sectional area within the range of about 20 to about 60% less than that of the pelletizing zone.

References Cited

UNITED STATES PATENTS

| | | | |
|---|---|---|---|
| 2,213,056 | 8/1940 | Skoog et al. | 23—314 |
| 2,828,190 | 3/1958 | King | 264—117 |
| 2,786,232 | 3/1957 | Larson et al. | 264—117 |
| 3,459,844 | 8/1969 | Cole | 264—117 |

ROBERT F. WHITE, Primary Examiner

J. R. HALL, Assistant Examiner

U.S. Cl. X.R.

23—314; 18—1 A